(12) United States Patent
Yamamoto et al.

(10) Patent No.: US 7,952,020 B2
(45) Date of Patent: May 31, 2011

(54) WATER STOPPING STRUCTURE AND WATER STOPPING METHOD

(75) Inventors: Kouichi Yamamoto, Kosai (JP); Hidehiro Ichikawa, Kosai (JP); Shigemi Hashizawa, Kosai (JP)

(73) Assignee: Yazaki Corporation, Tokyo (JP)

( * ) Notice: Subject to any disclaimer, the term of this patent is extended or adjusted under 35 U.S.C. 154(b) by 1041 days.

(21) Appl. No.: 11/753,109

(22) Filed: May 24, 2007

(65) Prior Publication Data

US 2008/0000672 A1  Jan. 3, 2008

(30) Foreign Application Priority Data

May 25, 2006 (JP) .................. 2006-145253

(51) Int. Cl.
*H01B 7/288* (2006.01)
(52) U.S. Cl. ........................ 174/23 R; 174/93
(58) Field of Classification Search .......... 174/20, 174/22 R, 23 R, 77 R, 93, 84 C
See application file for complete search history.

(56) References Cited

U.S. PATENT DOCUMENTS

| | | | |
|---|---|---|---|
| 2,981,787 A * | 4/1961 | Brautigam et al. ......... | 174/84 C |
| 3,573,346 A * | 4/1971 | Appleby .................... | 174/71 R |
| 4,038,490 A | 7/1977 | Miller et al. | |
| 4,484,022 A | 11/1984 | Eilentropp | |
| 5,170,017 A | 12/1992 | Stanevich et al. | |
| 6,444,914 B1 * | 9/2002 | Su .............................. | 174/84 R |
| 7,612,287 B2 * | 11/2009 | Ichikawa et al. ............ | 174/77 R |
| 7,622,677 B2 * | 11/2009 | Barberree et al. .......... | 174/88 R |
| 2004/0166732 A1 | 8/2004 | Schliese | |

FOREIGN PATENT DOCUMENTS

| | | |
|---|---|---|
| DE | 17 90 145 B2 | 1/1972 |
| DE | 201 832 A5 | 8/1983 |
| DE | 84 08 970 U1 | 8/1985 |
| DE | 692 13 274 T2 | 3/1997 |
| DE | 198 34 680 A1 | 2/2000 |
| DE | 199 21 564 A1 | 11/2000 |
| DE | 199 61 423 A1 | 7/2001 |
| DE | 101 28 301 A1 | 1/2003 |
| DE | 20 2005 020 718 U1 | 7/2006 |
| JP | 08-185722 A | 7/1996 |
| JP | 2000-011771 A | 1/2000 |
| JP | 2004-072943 A | 3/2004 |
| JP | 2004-355851 A | 12/2004 |

OTHER PUBLICATIONS

German Office Action dated May 15, 2009.

* cited by examiner

*Primary Examiner* — Chau N Nguyen
(74) *Attorney, Agent, or Firm* — Sughrue Mion, PLLC

(57) ABSTRACT

A water stopping structure includes a water stopping member that has an outer peripheral face which is inclined with respect to an axis direction of a shielded wire, and that is adapted to contract a diameter thereof and attached on an outer face of the shielded wire in a state that the outer peripheral face of the water stopping member is positioned to an end portion of the sheath which is adjacent to an exposed portion of the outer sheath, and a fastening ring that has an inner peripheral face which is corresponded to the outer peripheral face of the water stopping member in inclination. The fastening ring is slid in the axis direction of the shielded wire so as to press the end portion of the sheath of the shielded wire for contracting the diameter of the water stopping member in a state that the inner peripheral face of the fastening ring is arranged on the outer peripheral face of the water stopping member.

6 Claims, 12 Drawing Sheets

WATER STOPPING STRUCTURE AND WATER STOPPING METHOD

BACKGROUND OF THE INVENTION

The present invention relates to a water stopping structure of a shielded member in a shielded wire and a water stopping method using the water stopping structure.

There is known a water stopping structure of an electric wire of permeating an adhering agent having a fluidity to an inner side of a cover member covering a core and curing the adhering agent to thereby prevent invasion of water through a gap on an inner side of the cover member.

In this case, for example, as described in Patent Reference 1, the adhering agent is firmly permeated to a wide range by supplying the adhering agent from a wire terminal on one side and sucking air on an inner side of a cover member from a wire terminal on other side.

[Patent Reference 1] JP-A-2004-355851

Meanwhile, although when water is intended to cut off from a shielded wire arranged with a shielded member (knit structure, metal foil, net-like press metal or the like) surrounding the core on an inner side of an outer skin (sheath), separately from cutting off water from the core, also cut-off of water of the shielded member needs to be taken into consideration, by only supplying the adhering agent simply at an exposed portion of the shielded member as in the background art, the adhering agent cannot be permeated effectively to the shielded member, and there is a concern that a sufficient water stopping function cannot be ensured.

On the other hand, although there is also the method of sucking air from a terminal side separately from a supply side of the adhering agent as one proposal, in the case of the method, a facility for sucking air is needed, or operation is troublesome and difficult, and therefore, there poses a problem that the method is not satisfactory in view of cost.

SUMMARY OF THE INVENTION

It is an object of the invention to provide a water stopping structure and a water stopping method of a shielded wire capable of cutting off water from a shield portion at low cost, simply, firmly.

In order to achieve the above object, according to the present invention, there is provided a water stopping structure for a shielded wire having an outer sheath in which a part of the outer sheath is exposed and an adhering agent is permeated to the shielded wire through the exposed part, the water stopping structure comprising:

a water stopping member that has an outer peripheral face which is inclined with respect to an axis direction of the shielded wire, and that is adapted to contract a diameter thereof and attached on an outer face of the shielded wire in a state that the outer peripheral face of the water stopping member is positioned to an end portion of the sheath which is adjacent to the exposed portion of the outer sheath; and a fastening ring that has an inner peripheral face which is corresponded to the outer peripheral face of the water stopping member in inclination, wherein the fastening ring is slid in the axis direction of the shielded wire so as to press the end portion of the sheath of the shielded wire for contracting the diameter of the water stopping member in a state that the inner peripheral face of the fastening ring is arranged on the outer peripheral face of the water stopping member.

Preferably, the outer peripheral faces are provided at both end portions of the water stopping member. The water stopping member has a cylindrical shape and is configured by half-divided structures. The water stopping member include a hollow portion which contains the exposed portion of the shielded wire, and containing portions which contain both end portions of the sheath which are adjacent to the exposed portion of the outer sheath. A pair of the fastening rings are provided.

Preferably, a drain hole is provided on a peripheral wall of the water stopping member, and is communicated with the hollow portion.

Preferably, the water stopping structure further includes a fastening member that is provided between the fastening ring and the water stopping member. The fastening member slides the fastening ring in the axis direction.

In the above configurations, the sheath of the shielded wire is peeled, the adhering agent is permeated to the exposed shielded member, thereafter, the water stopping member is mounted to cover the portion. Further, in the state of positioning the position of the outer peripheral taper face of the water stopping member to the end portion of the peeked sheath, the fastening ring is fitted to the outer periphery of the water stopping member, in the state of overlapping the inner peripheral taper face of the fastening ring to the outer peripheral taper face of the water stopping member, the fastening ring is slid in the axial line direction, thereby, by the wedge action produced between the fastening ring and the inner peripheral taper face, the diameter of the water stopping member is contracted, and the end portion of the sheath is fastened from the outer periphery.

Thereby, a pressure can be applied to the adhering agent permeated to the inner side of the end portion of the sheath of the peeled portion from outside of the sheath, and the adhering agent can be cured while applying the pressure while increasing a degree of permeating the adhering agent to the gaps of the shielded member and inside and outside thereof. Therefore, the gap of the shielded member can firmly be sealed by the adhering agent, and the high water stopping function can be ensured. Further, by exerting the fastening force, the excellent adhering state can be maintained, and therefore, the high water stopping function can be maintained over a long period of time.

Further, the water stopping portion by the adhering agent is covered by the water stopping structure, and therefore, the structure is strong at a temperature change or an external force, excellent in environment resistance and can also achieve insulation of the peeled portion of the sheath. Further, by controlling the fastening force by the fastening ring in accordance with a diameter of the wire or the like, a balance between the water stopping function and service life can optimally be set. Further, only the water stopping member and the fastening ring are used, and therefore, water stopping of the shield portion can be carried out at low cost, simply, firmly, and can easily be realized.

In the above configurations, the water stopping member is constituted by the half-divided structure, the taper faces are provided at the both ends, and therefore, the water stopping member can simply be mounted to the middle peeled portion of the shielded wire, by fitting the fastening ring to the water stopping member, the water stopping of the middle peeled portion can simply and firmly be carried out.

In the above configurations, the drain hole is formed at the peripheral wall of the water stopping member, and therefore, even when water invades by spreading through the shielded member by accidentally exceeding a water stopping limit, water is drained, thereby, invasion of water to a destination of connection can be prevented.

In the above configurations, the fastening member is provided between the fastening ring and the water stopping member, and therefore, the fastening ring can simply be slid in a direction of producing the wedge action, further, the state can be maintained.

In the above configurations, the pressure can be applied to the adhering agent permeated to the inner side of the end portion of the sheath of the peeled portion from outside of the sheath, and therefore, the adhering agent can be cured while applying the pressure while increasing a degree of permeating the adhering agent to gaps of the shielded member and inside and outside thereof. Therefore, the gap of the shielded member can simply be sealed by the adhering agent, the high water stopping function can be ensured. Further, by exerting the fastening force, an excellent adhering state can be maintained, and therefore, the high water stopping function can be maintained over a long period of time.

Further, the water stopping portion by the adhering agent is covered by the water stopping member, and therefore, the structure is strong at a temperature change or an external force, excellent in environment resistance, an insulation of the peeled portion of the sheath can also be achieved. Further, by controlling the fastening force by the fastening ring in accordance with a diameter of the electric wire or the like, a balance between the water stopping function and the service life can optimally be set. Further, only the water stopping member and the fastening ring are used, and therefore, water stopping of the shield portion can be carried out at low cost, simply, firmly, and can easily be realized.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

Embodiments of the invention will be explained in reference to the drawings as follows.

First Embodiment

Figure 1:
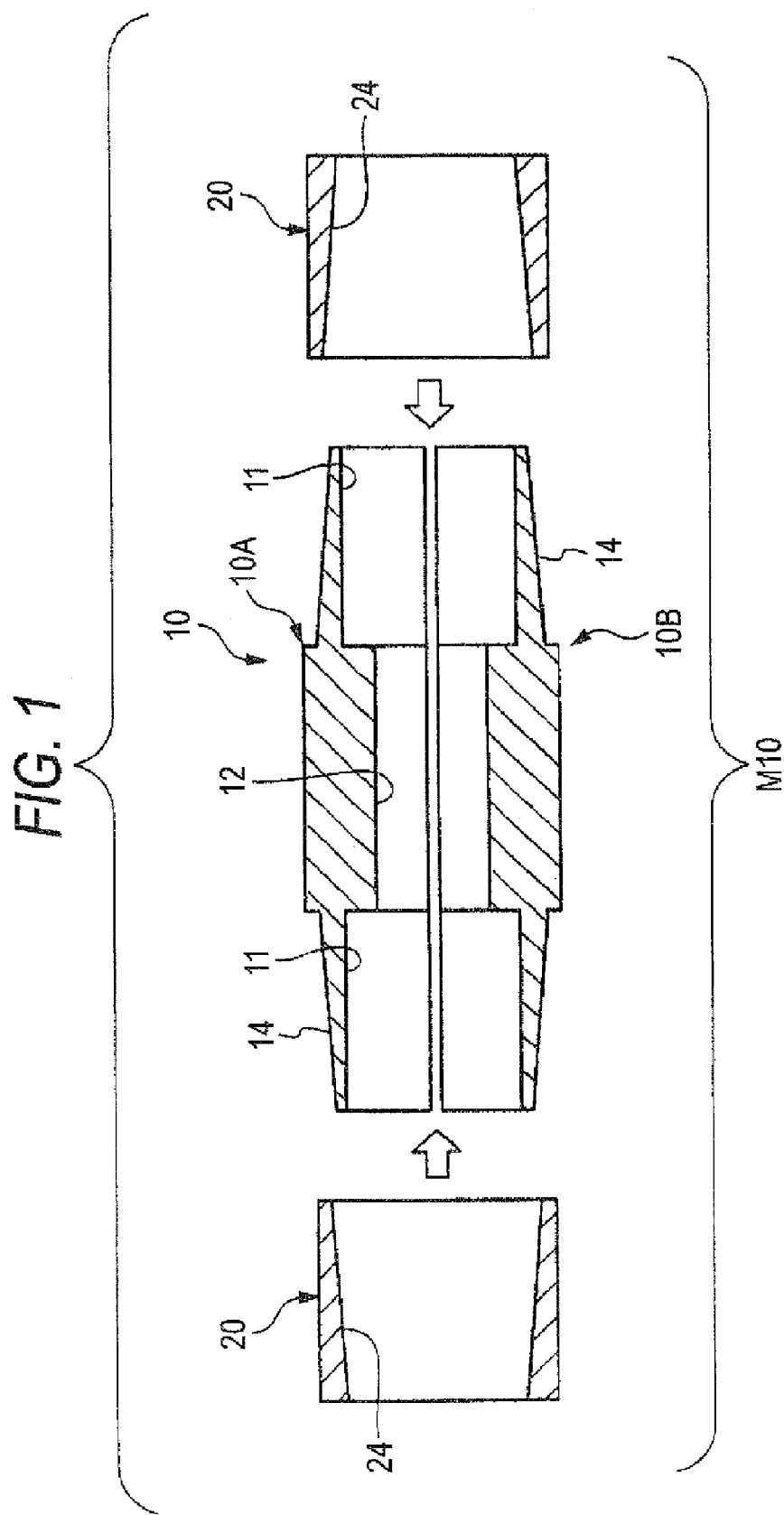
FIG. 1 is a sectional view showing a constitution of a water stopping structure according to a first embodiments.
Figure 2:
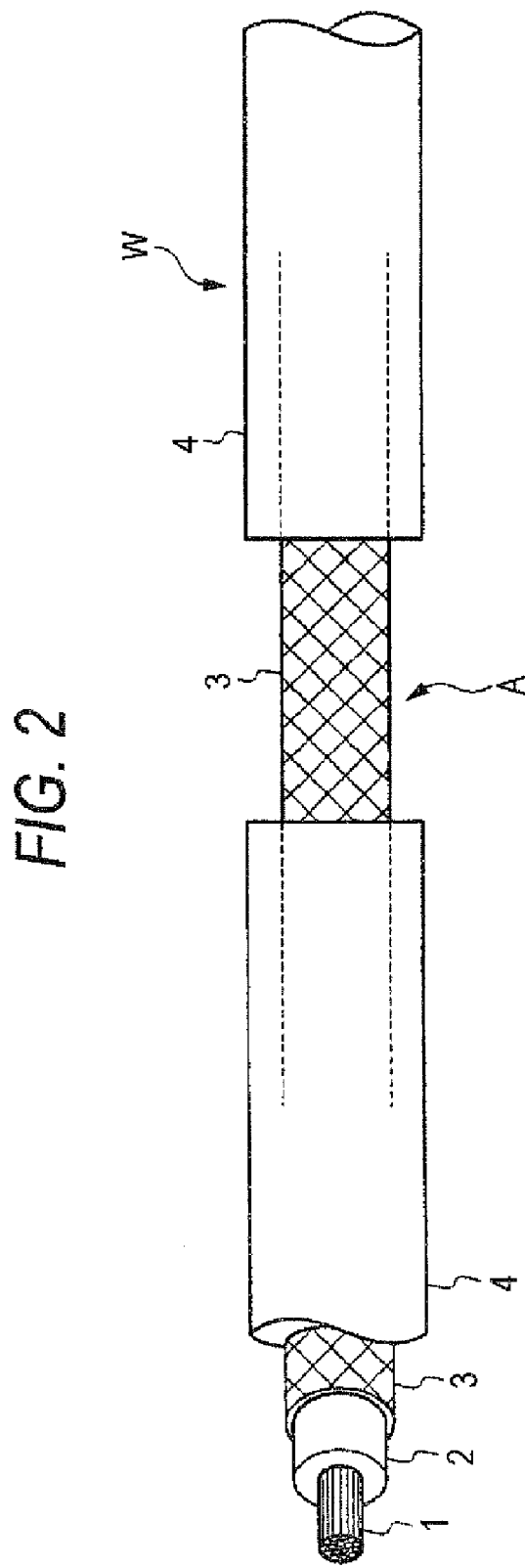
FIG. 2 is an explanatory view of a peeling step constituting a step before mounting the water stopping structure.
Figure 3:
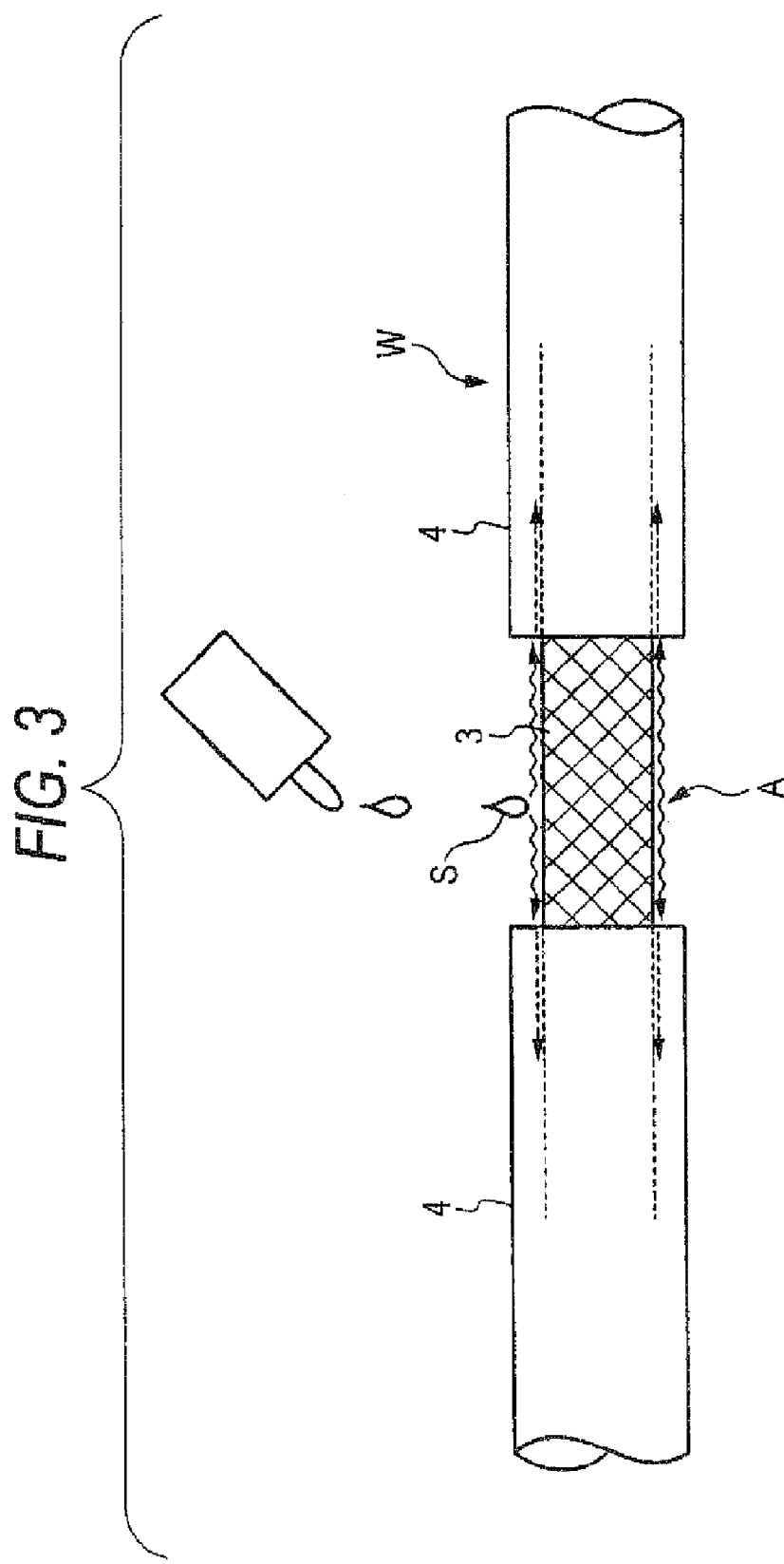
FIG. 3 is an explanatory view of a next step of supplying an adhering agent.
Figure 4:
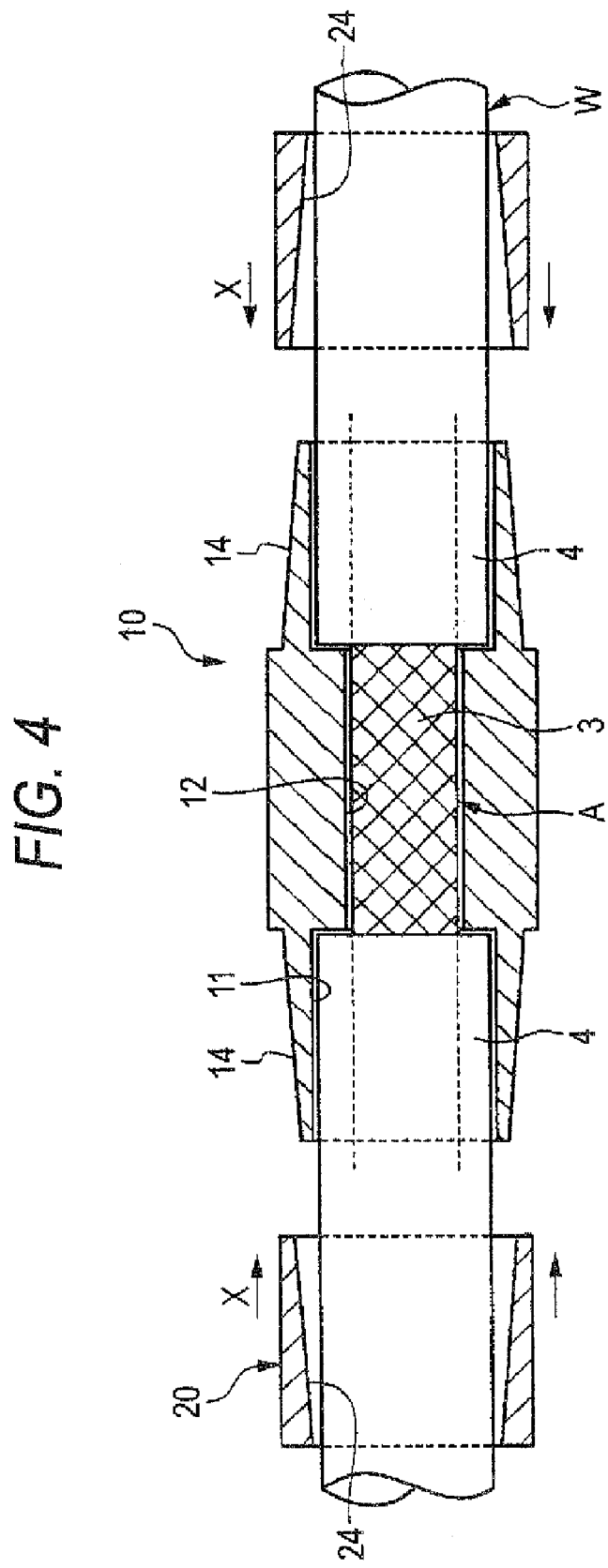
FIG. 4 is a sectional view showing a state of mounting the water stopping structure.
Figure 5:
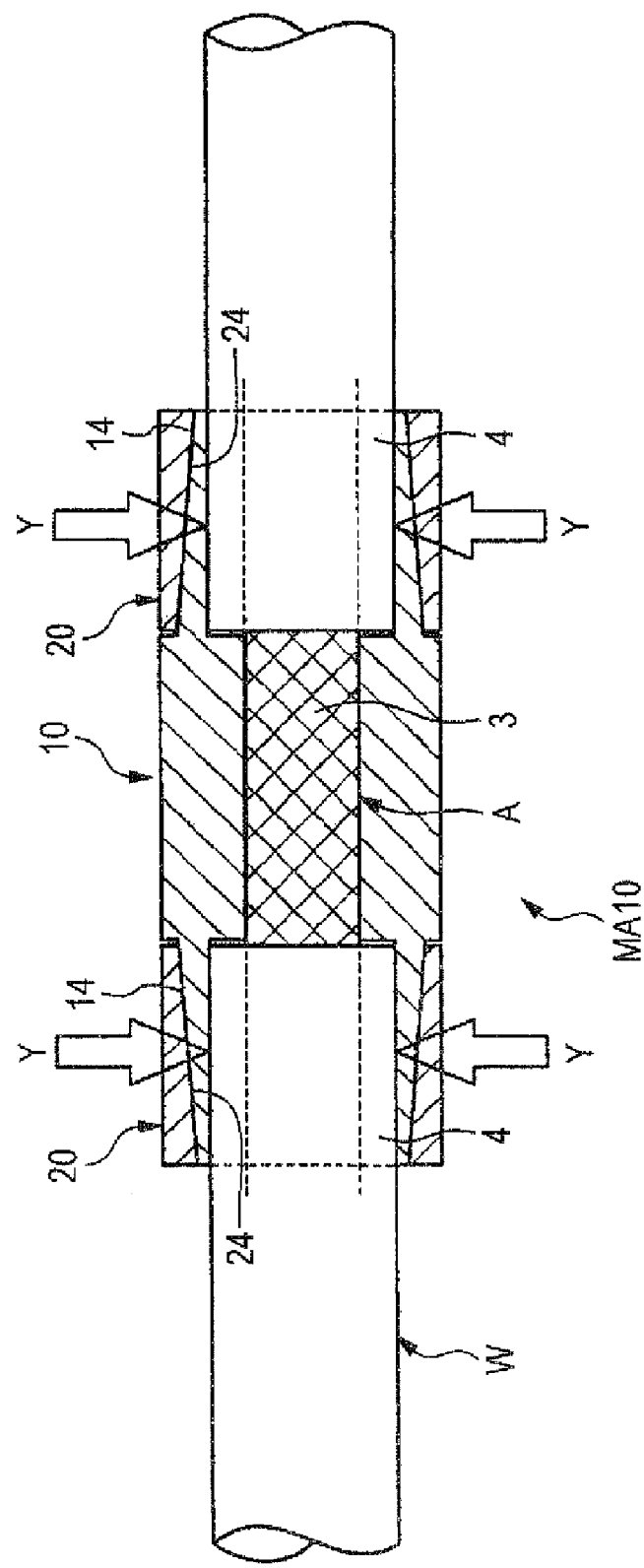
FIG. 5 is a sectional view of a water stopping structure finished by using the water stopping structure.

FIG. 1 is a sectional view showing a constitution of a water stopping structure M120 of a first embodiment, FIG. 2 is an explanatory view of a skin peeling step as a step before mounting the water stopping structure M10, FIG. 3 is an explanatory view of a next step of supplying an adhering agent, FIG. 4 is an explanatory view showing a state of mounting the water stopping member M10, FIG. 5 is a sectional view of a finished water stopping structure.

As shown by, for example, FIG. 2, a shielded wire W constituting an object of using the water stopping structure M10 is arranged with a core 1, an insulating member 2, a shielded member 3 of a knit structure or the like, and a sheath 4 constituting an outer skin successively from an inner side to an outer side.

As shown by FIG. 2 through FIG. 5, a middle of the sheath 4 of the shielded wire W is peeled, an adhering agent S is permeated to the disposed shielded member 3, thereafter, the water stopping member M10 is mounted to cover the portion.

The water stopping structure M10 in this case includes a water stopping member 10, and a pair of fastening rings 20 mounted to outer peripheries of both ends of the water stopping member 10.

The water stopping member 10 includes outer peripheral taper faces 14 at the outer peripheries of the both ends. The water stopping member 10 is constituted by a cylindrical shape mounted to an outer periphery of the shielded wire W in a state of positioning the position of the outer peripheral taper face 14 to an end portion of the peeled sheath 4. The water stopping member 10 is constituted by a half-divided structure to be able to contract a diameter thereof. That is, the water stopping member 10 in the cylindrical shape is constituted by matching two half members 10a, 10b divided by a plane including an actual line.

Inside of the water stopping member 10 is provided with a hollow portion 12 having a small diameter containing the middle peeled portion A of the shielded wire W, and containing portions 11 of sheath end portions on both sides having a diameter larger than the diameter of the hollow portion 12, and stepped differences are attached to between the center hollow portion 12 having the small diameter and the containing portions 11 of the sheath end portions having the large diameter on both sides thereof to facilitate positioning.

Further, the fastening ring 20 is constituted by a cylindrical shape and is provided with an inner peripheral face 24 in correspondence with the outer peripheral taper face 14 on a side of the water stopping member 10.

When water stopping is carried out by using the water stopping structure M10, first, as shown by FIG. 2, the middle of the sheath 4 of the shielded wire W is peeled, and the adhering agent S is permeated to the portion A at which the shielded member 3 is exposed by peeling the middle. Then, as shown by an arrow mark of FIG. 3, the adhering agent S is permeated to an inner side of an end portion of the sheath 4 by spreading through a small gap of the shielded member 3.

Under the state, as shown by FIG. 4, the water stopping member 10 is formed so as to cover the middle peeled portion A, the end portion of the sheath 4 is contained in the containing portion 11, and the exposed portion of the shielded member 3 is contained in the hollow portion 12. Under the state, the position of the outer peripheral taper face 14 is positioned to the end portion of the peeled sheath 4.

Successively, the fastening ring 20 previously passed through the outer periphery of the shielded wire W is slid in an arrow mark X direction and the fastening ring 20 having the inner peripheral taper face 24 is fitted to the outer periphery of the water stopping member 10.

Further, by further sliding the fastening ring 20 in X direction in a state of overlapping the inner peripheral taper face 24 to the outer peripheral taper face 14, the diameter of the water stopping member 10 is contracted by a wedge action produced between the inner peripheral taper face 24 and the outer peripheral taper face 14, thereby, a fastening force (arrow mark Y) is exerted from the outer periphery to the end portion of the sheath 4. Thereby, the water stopping structure MA10 of FIG. 5 is finished.

According to the structure of fastening by the water stopping structure M10 in this way, a pressure can be applied from outside of the sheath 4 to the adhering agent S permeated to the inner side of the end portion of the sheath 4 at the peeled portion, and therefore, the adhering agent S can be cured while applying the pressure by increasing a degree of permeating the adhering agent to gaps of the shielded member 3 and inside and outside thereof.

Therefore, the gap of the shielded member 3 can be sealed firmly by the adhering agent S, and a high water stopping function can be ensured. Further, excellent adhered state can be maintained by applying the fastening force, and therefore, the high water stopping function can be maintained over a long period of time.

Further, the water stopping portion by the adhering agent S is covered by the water stopping structure M10, and therefore, the structure is strong at a temperature change or an external force, and is excellent in environment resistance, and also insulation of the peeled portion A of the sheath 4 can be achieved. Further, by controlling the fastening force by the fastening ring 20 in accordance with a diameter of the shielded wire W or the like, a balance between the water stopping function and service life can optimally be set. Further, only the water stopping member 10 and the fastening ring 20 are used, and therefore, water stopping of the shield portion can be carried out at low cost, simply, firmly, and is easily realized.

Further, according to the water stopping structure M10, the water stopping member 10 in the cylindrical shape is constituted by the half-divided structure, and therefore, can simply be mounted to the middle peeled portion A of the shielded wire W and also achieve an advantage of capable of carrying out water stopping of the middle peeled portion A simply and firmly.

Second Embodiment

Figure 6:
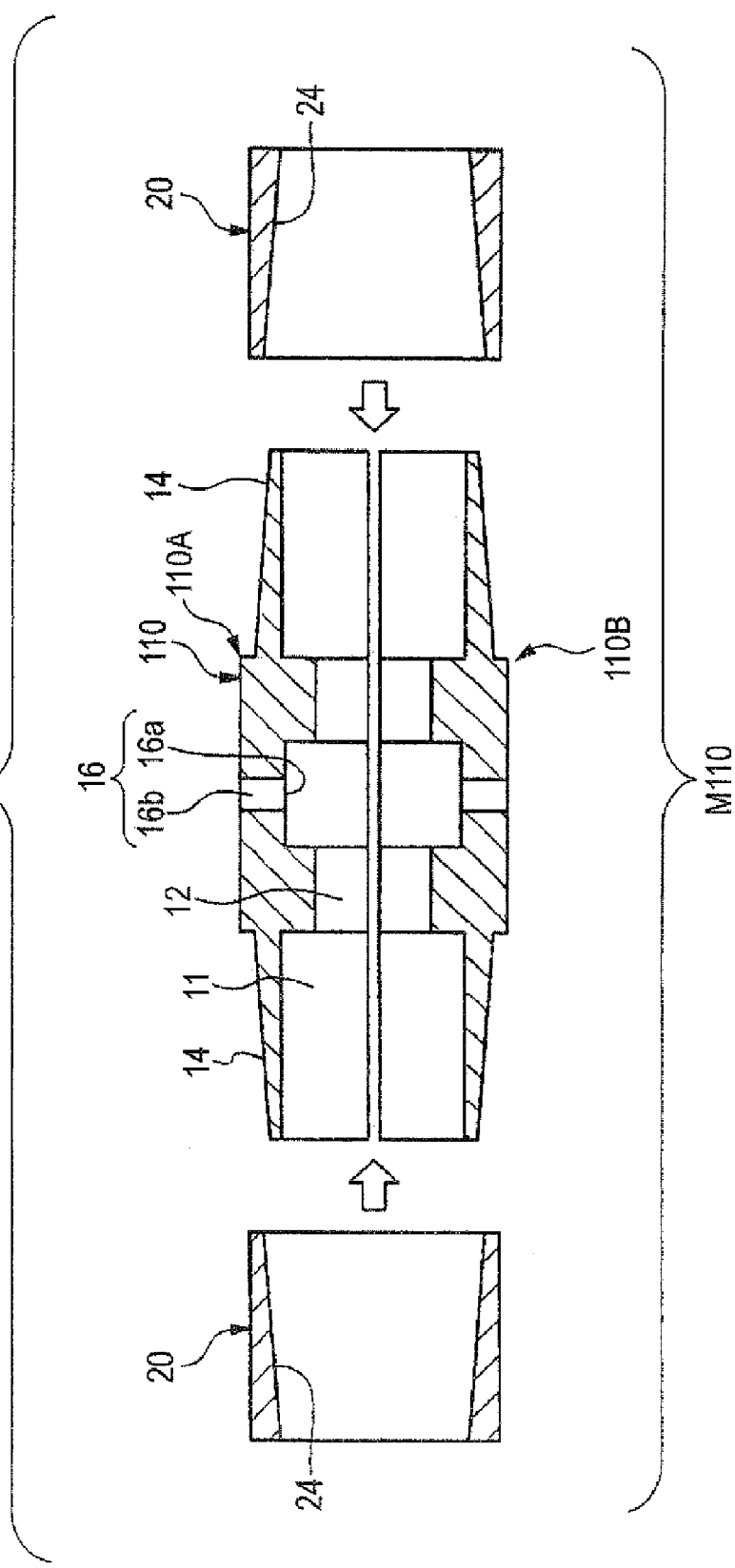
FIG. 6 is a sectional view of a water stopping structure according to a second embodiment of the invention.

FIG. 6 is a sectional view of a water stopping structure M110 of a second embodiment of the invention.

Figure 7:
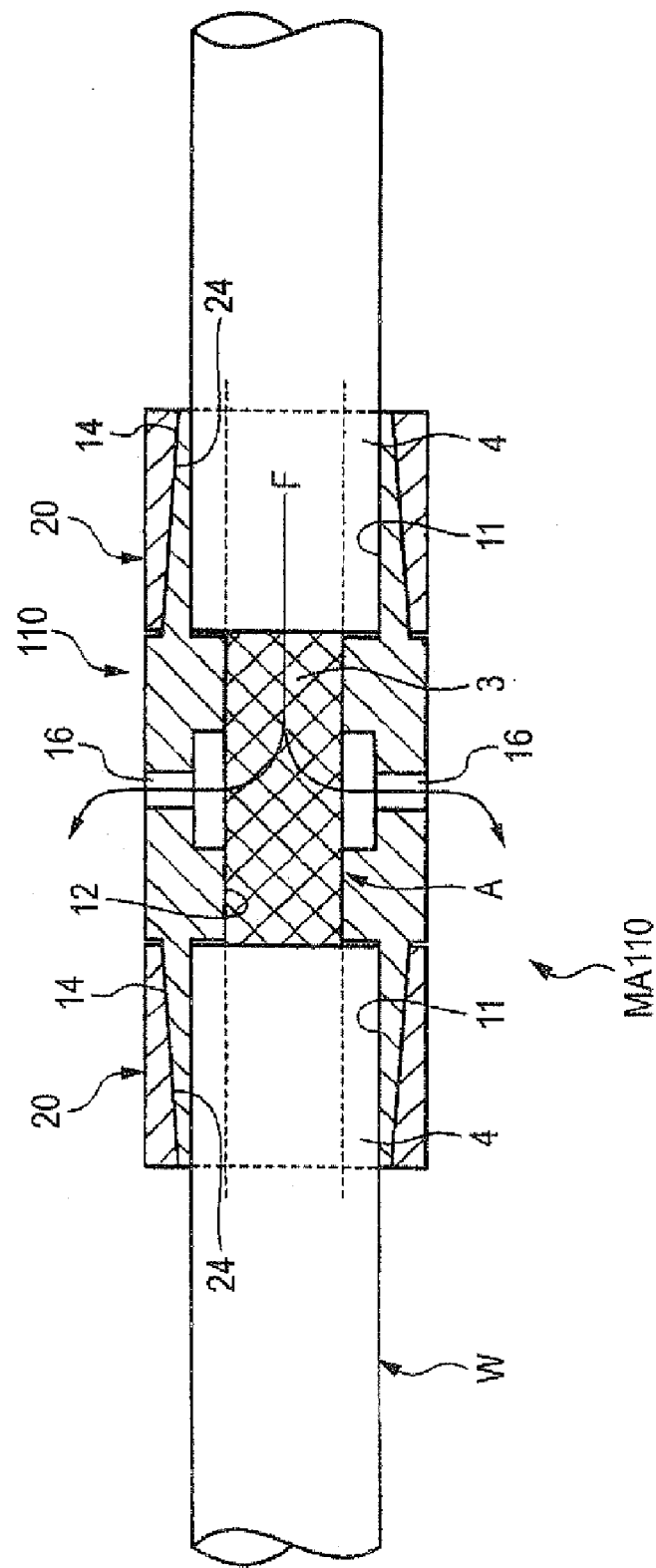
FIG. 7 is a sectional view of a water stopping structure finished by using the water stopping structure.

The water stopping structure M110 is constructed by a constitution the same as that of the water stopping structure M10 of the first embodiment except that a drain hole 16 is formed at a peripheral wall of a water stopping member 110 to be communicated with the hollow portion 12. The water drain hole 16 is constituted by a ring-like groove 16a formed at an inner peripheral wall of the hollow portion 12, and a through hole 16b bored in a radius direction to be communicated with the ring-like groove 16a. Also in a case of using the water stopping structure M110, the water stopping structure MA110 as shown by FIG. 7 is provided after having been processed by steps similar to those of the first embodiment.

When the drain hole 16 is formed at the peripheral wall of the water stopping member 110 in this way, even in a case in which water F invades by spreading through the shielded member 3 accidentally by exceeding a water stopping limit, the water is drained at the midway at the water stopping structure MA110 of the middle portion of the shielded wire W, thereby, invasion of water to a destination of connection can be prevented.

Figure 8:
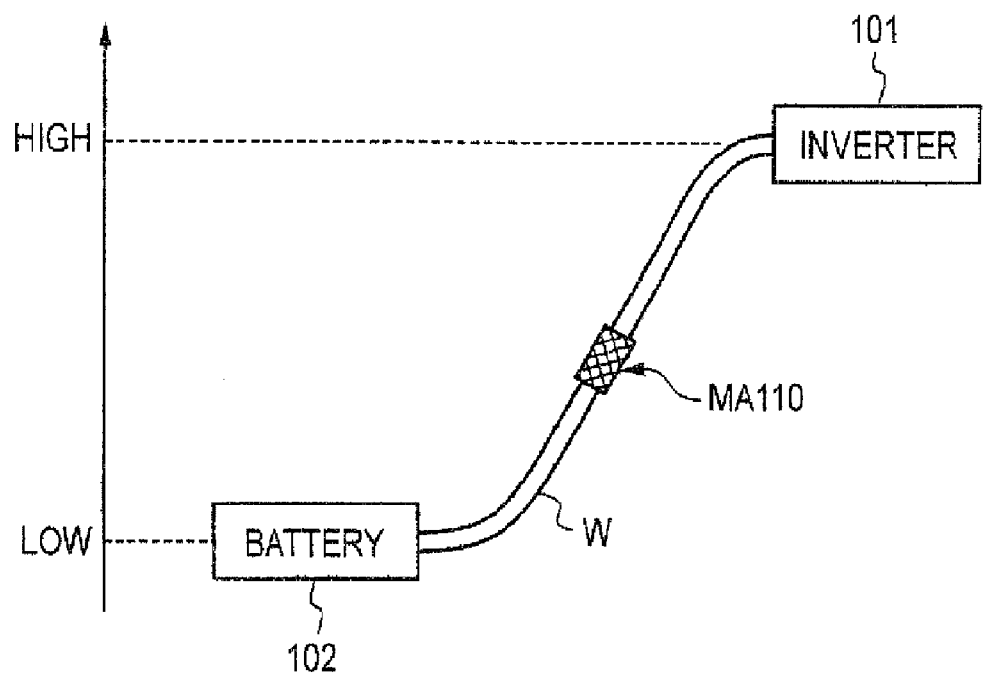
FIG. 8 is a view showing an example of applying the water stopping structure using the water stopping structure.

That is, in a case of connecting an inverter 101 and a battery 102 arranged with a height difference by the shielded wire W as shown by an example of FIG. 8, when water invades a side of the inverter 101, by presence of the height difference, water flows to a side of the battery 102 by spreading through the shielded member 3 (refer to FIG. 7) at inside of the shielded wire W.

At normal level, invasion of the water can be prevented by providing the water stopping structure M110 at the midway, however, at a level of exceeding the water stopping limit, there is a possibility of extending invasion of water to the side of the battery 102. In this respect, the water stopping structure M110 is provided with the drain hole 16 (refer to FIG. 7) at the water stopping member 110, and therefore, even in the case of exceeding the water stopping limit, water can be escaped by the water stopping structure M110 per se. Therefore, a concern of invasion of water to the side of the battery 102 can be eliminated.

Third Embodiment

Figure 9:
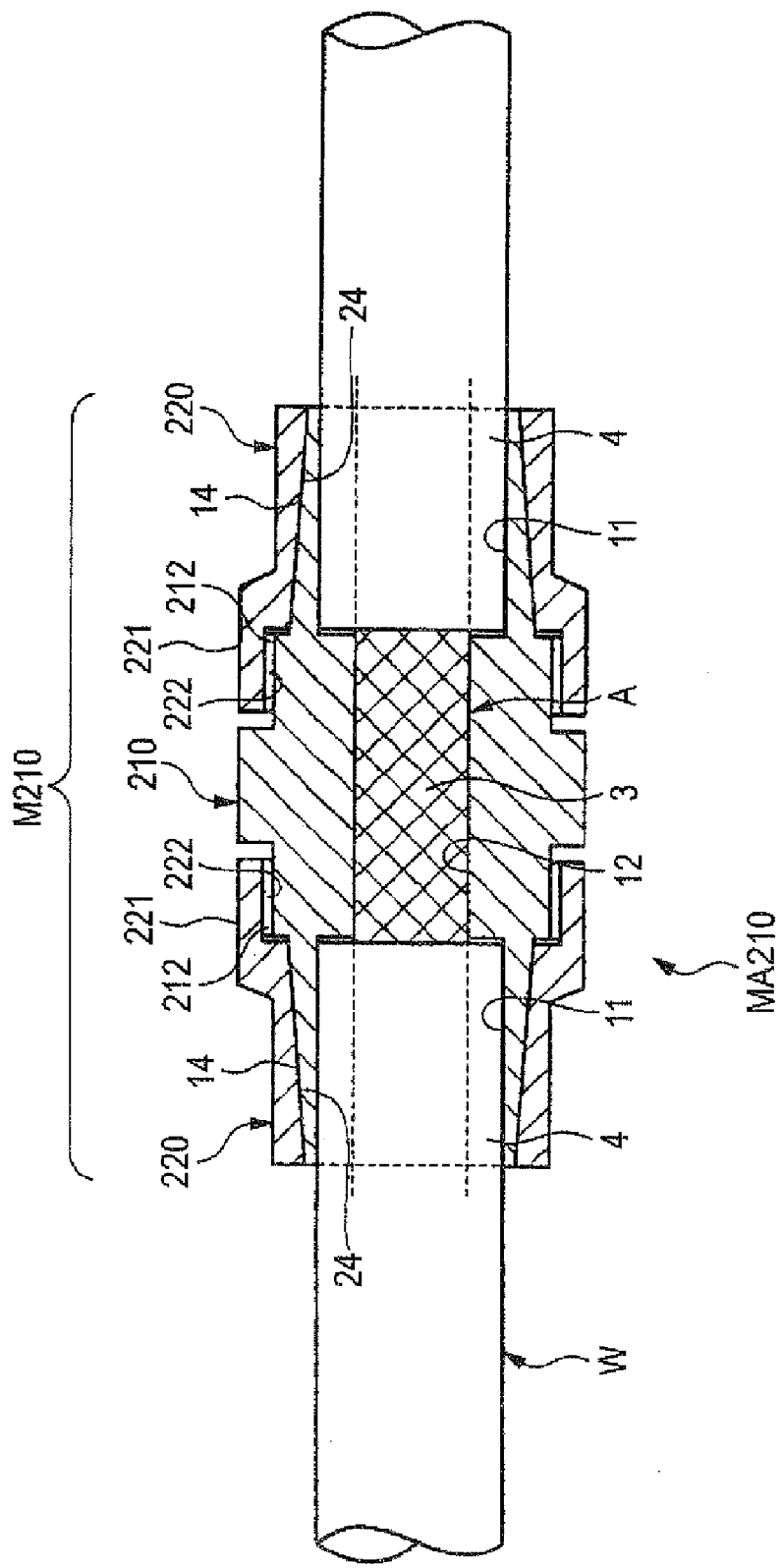
FIG. 9 is a sectional view of a third embodiment of the invention.

FIG. 9 is a sectional view of a water stopping structure MA210 realized by using a water stopping structure M210 according to a third embodiment of the invention.

The water stopping structure M210 is provided with screw mechanism (fastening member) comprising a male screw 212 and a female screw 222 for sliding a fastening ring 220 in a direction of producing a wedge action between the fastening ring 220 and a water stopping member 220.

Here, a large diameter portion 221 is provided at an end portion of the fastening ring 220, the female screw 222 is provided at an inner periphery thereof, on the other hand, the male screw 212 to be screwed with the female screw 222 is provided at an outer periphery of an end portion of the water stopping member 210. Other constitution is the same as that of the first embodiment.

In this way, by providing the screw mechanism comprising the female screw 222 and the male screw 212 between the water stopping member 210 and the fastening ring 220, by turning the fastening ring 220, the fastening ring 220 is slid in a direction of producing the wedge action, thereby, the water stopping member 210 can be fastened. Further, the state can stably be maintained.

Fourth Embodiment

Figure 10:
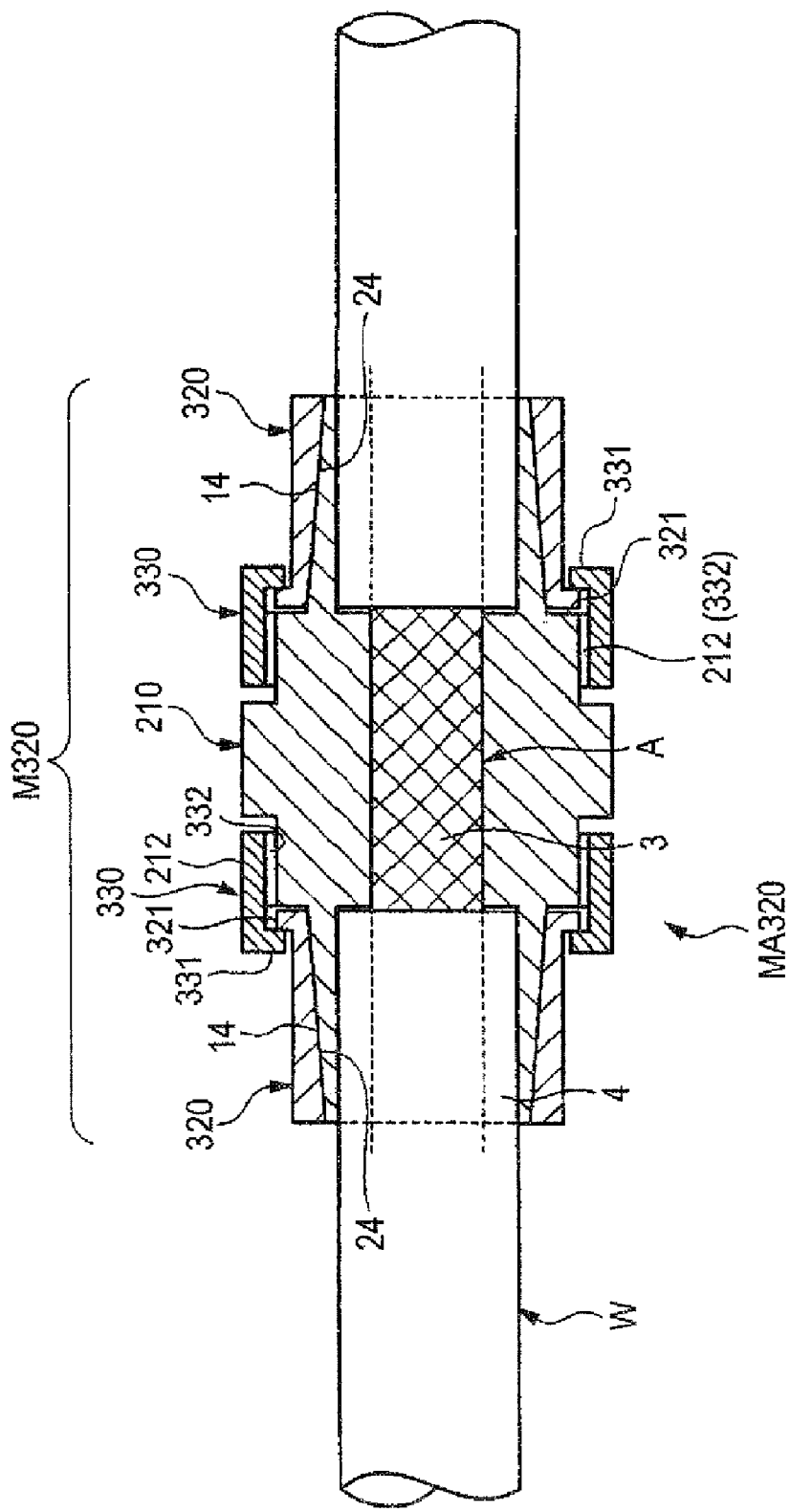
FIG. 10 is a sectional view of a fourth embodiment of the invention.

FIG. 10 is a sectional view of a water stopping structure MA320 realized by using a water stopping structure M320 according to a fourth embodiment of the invention.

According to the water stopping structure M320, although the water stopping member 210 the same as that of the third embodiment is used, a constitution of a side of a fastening ring 320 is made to differ from that of the third embodiment.

That is, the fastening ring 320 is not directly provided with a female screw 332 but a total periphery flange portion 321 is provided at an end portion of the fastening ring 320, one end of a rotating ring 330 is rotatably engaged with the total periphery flange portion 321, and an inner periphery of the rotating ring 330 is formed with the female screw 332 to be screwed with the male screw 212 on the side of the water stopping member 210 Other constitution is the same as that of the third embodiment.

According to the embodiment, by turning the rotating ring 330, by operation of the screws, the fastening ring 320 can be slid. In this case, it is not necessary to directly rotate the fastening ring 320, and therefore, a friction resistance can be reduced, and the fastening ring 320 can be slid in an axial direction easily by that amount.

Fifth Embodiment

Figure 11:
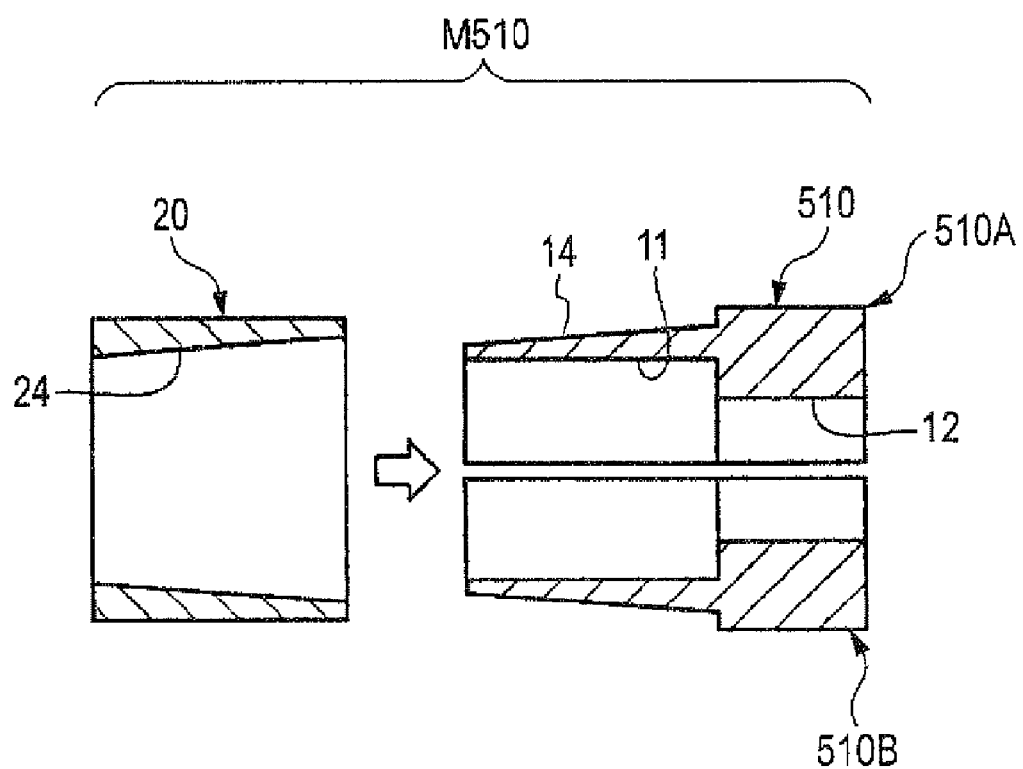
FIG. 11 is a sectional view showing a water stopping structure according to a fifth embodiment of the invention.
Figure 12:
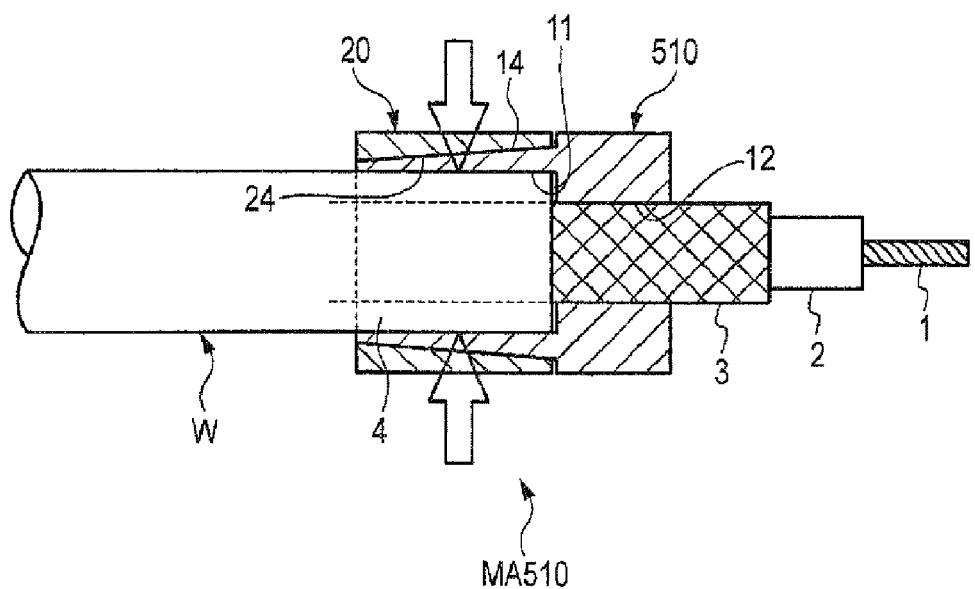
FIG. 12 is a sectional view of a water stopping structure finished by using the water stopping structure.

FIG. 11 is a sectional view of a water stopping structure M520 according to a fifth embodiment of the invention, FIG. 12 is a sectional view of a water stopping structure MA510 realized by using the water stopping structure M510.

Although according to the first through the fourth embodiments, there is shown a case of simultaneously cutting off water from the both sides of the middle peeled portion A, according to the embodiment, one side water stopping is taken into consideration. That is, the water stopping structure M520 is constituted by a water stopping structure 510 constituted by cutting the water stopping member 10 (refer to FIG. 1) of the first embodiment by a half in a longitudinal direction by one piece of the fastening ring 20. The water stopping member 510 is halved to two half members 510A, 510B similar to the first embodiment.

Since the one side water stopping type is constituted in this way, as shown by FIG. 12, water can be cut off from a terminal portion of the shielded wire W.

Further, water stopping of the middle peeled portion can also be carried out by using 2 sets of the water stopping structures M510.

Further, the water stopping structure 510 may be provided with a screw mechanism as in the third, the fourth embodiments.

Although the invention has been illustrated and described for the particular preferred embodiments, it is apparent to a person skilled in the art that various changes and modifications can be made on the basis of the teachings of the invention. It is apparent that such changes and modifications are within the spirit, scope, and intention of the invention as defined by the appended claims.

The present application is based on Japan Patent Application No. 2006-145253 filed on May 25, 2006, the contents of which are incorporated herein for reference.

What is claimed is:

1. A water stopping structure for a shielded wire having an outer sheath in which a part of the outer sheath is exposed and an adhering agent is permeated to the shielded wire through the exposed part, the water stopping structure comprising:
a water stopping member, the water stopping member having a first portion having a first inner diameter and a second portion having a second inner diameter that is greater than the first inner diameter, the first portion contacting the shield wire through the exposed part and the second portion contacting the outer sheath adjacent the exposed portion, the second portion having an outer peripheral face which is inclined with respect to an axis direction of the shield wire; and
a fastening ring that has an inner peripheral face which is inclined to correspond to the incline of the outer peripheral face of the second portion of the water stopping member,
wherein the fastening ring is slid over the second portion in the axis direction of the shielded wire so that the inclined inner peripheral face of the fastening ring is arranged on the inclined outer peripheral face of the second portion of the water stopping member to thereby contract the diameter of the second portion of the water stopping member to grasp the outer sheath.

2. The water stopping structure according to claim 1, wherein the water stopping member includes another second portion at the opposite end of the water stopping member;
wherein the water stopping member has a cylindrical shape and is configured by half-divided structures;
wherein the water stopping member include:
a hollow portion provided in the first portion which contains the exposed portion of the shielded wire; and
containing portions respectively provided in the second portions which contain both end portions of the sheath which are adjacent to the exposed portion of the outer sheath; and
wherein a pair of the fastening rings are provided.

3. The water stopping structure according to claim 2, wherein a drain hole is provided on a peripheral wall of the water stopping member, and is communicated with the hollow portion.

4. The water stopping structure according to claim 1, further comprising:
a fastening member that is provided between the fastening ring and the water stopping member,
wherein the fastening member slides the fastening ring in the axis direction.

5. A water stopping structure for a shielded wire having an outer sheath in which a part of the outer sheath is exposed and an adhering agent is permeated to the shielded wire through the exposed part, the water stopping structure comprising:
a water stopping member that has an outer peripheral face which is inclined with respect to an axis direction of the shielded wire, and that is adapted to contract a diameter thereof and attached on an outer face of the shielded wire in a state that the outer peripheral face of the water stopping member is positioned to an end portion of the sheath which is adjacent to the exposed portion of the outer sheath; and
a fastening ring that has an inner peripheral face which is corresponded to the outer peripheral face of the water stopping member in inclination,
wherein the fastening ring is slid in the axis direction of the shielded wire so as to press the end portion of the sheath of the shielded wire for contracting the diameter of the water stopping member in a state that the inner peripheral face of the fastening ring is arranged on the outer peripheral face of the water stopping member,
wherein the outer peripheral faces are provided at both end portions of the water stopping member,
wherein the water stopping member has a cylindrical shape and is configured by half-divided structures,
wherein the water stopping member include:
a hollow portion which contains the exposed portion of the shielded wire; and
containing portions which contain both end portions of the sheath which are adjacent to the exposed portion of the outer sheath;
wherein a pair of the fastening rings are provided, and
wherein a drain hole is provided on a peripheral wall of the water stopping member, and is communicated with the hollow portion.

6. A water stopping structure for a shielded wire having an outer sheath in which a part of the outer sheath is exposed and an adhering agent is permeated to the shielded wire through the exposed part, the water stopping structure comprising:
a water stopping member that has an outer peripheral face which is inclined with respect to an axis direction of the shielded wire, and that is adapted to contract a diameter thereof and attached on an outer face of the shielded wire in a state that the outer peripheral face of the water stopping member is positioned to an end portion of the sheath which is adjacent to the exposed portion of the outer sheath;

a fastening ring that has an inner peripheral face which is corresponded to the outer peripheral face of the water stopping member in inclination, wherein the fastening ring is slid in the axis direction of the shielded wire so as to press the end portion of the sheath of the shielded wire for contracting the diameter of the water stopping member in a state that the inner peripheral face of the fastening ring is arranged on the outer peripheral face of the water stopping member; and a fastening member that is provided between the fastening ring and the water stopping member, wherein the fastening member slides the fastening ring in the axis direction.

* * * * *